United States Patent
Hollingsworth et al.

(10) Patent No.: US 8,527,238 B2
(45) Date of Patent: Sep. 3, 2013

(54) STORAGE INPUT/OUTPUT UTILIZATION ASSOCIATED WITH A SOFTWARE APPLICATION

(75) Inventors: Matt Hollingsworth, Redmond, WA (US); John M. Oslake, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 908 days.

(21) Appl. No.: 12/242,710

(22) Filed: Sep. 30, 2008

(65) Prior Publication Data

US 2010/0082300 A1 Apr. 1, 2010

(51) Int. Cl.
G06F 11/30 (2006.01)

(52) U.S. Cl.
USPC ............................................. 702/186

(58) Field of Classification Search
USPC ............................................. 702/186
See application file for complete search history.

(56) References Cited

U.S. PATENT DOCUMENTS

| 6,044,335 | A | 3/2000 | Ksendzov |
| 7,243,145 | B1 | 7/2007 | Poortman |
| 7,325,234 | B2 | 1/2008 | Smith |
| 2002/0152305 | A1* | 10/2002 | Jackson et al. ............... 709/224 |
| 2003/0212792 | A1* | 11/2003 | Raymond ...................... 709/225 |
| 2004/0025162 | A1 | 2/2004 | Fisk et al. |
| 2004/0088404 | A1 | 5/2004 | Aggarwal |
| 2005/0022185 | A1 | 1/2005 | Romero et al. |
| 2006/0215552 | A1* | 9/2006 | Iwata et al. ................... 370/229 |
| 2006/0218285 | A1 | 9/2006 | Talwar et al. |
| 2008/0052719 | A1 | 2/2008 | Briscoe et al. |
| 2008/0077868 | A1 | 3/2008 | Bartucca et al. |
| 2010/0076805 | A1* | 3/2010 | Batsakis et al. .................. 705/8 |

OTHER PUBLICATIONS

Meier, et al., "Improving .NET Application Performance and Scalability", retrieved at <<http://msdn.microsoft.com/en-us/library/ms998579.aspx>>, May 2004, pp. 1-23.
Nigam et al., "Capacity Planning Techniques for BEA WebLogic Server Deployments", BEA Systems Inc., BEA World 2005, pp. 1-29.

* cited by examiner

Primary Examiner — Stephen Cherry
(74) Attorney, Agent, or Firm — Toler Law Group, PC

(57) ABSTRACT

A method includes determining a total storage input/output capacity of a set of storage elements available for use by a software application located on an operating system volume of a computer system. The total storage input/output capacity is determined by evaluating storage input/output capacity of the storage elements at a physical device level and at a file level. The method includes measuring a number of input/output storage operations performed on behalf of the software application. The method also includes determining a storage input/output utilization of the software application based on the measured number of input/output storage operations as compared to the total storage input/output capacity of the set of storage elements.

20 Claims, 7 Drawing Sheets

STORAGE INPUT/OUTPUT UTILIZATION ASSOCIATED WITH A SOFTWARE APPLICATION

BACKGROUND

Software applications use hardware resources such as storage devices which have limited capacities. At the same time, applications often have specific service level expectations which are reliant in part on the resource capacity of the hardware. While some types of hardware resource usage and capacity are easy to measure, determining the storage I/O usage and capacity available to a specific file at a specific point in time is difficult, especially when storage system resources are concurrently shared among several computers and software applications.

For example, the use of storage area networks (SANs) and network attached storage (NAS) that may be shared across multiple computers results in many layers of abstraction between a physical storage device and a logical file. A file may have access to one of several operating system volumes on an operating system disk and each operating system disk may be associated with a storage device logical unit number (LUN) that spans multiple physical storage devices in a storage group within a storage array. One or more of these physical storage devices may furthermore be accessed by an entirely different set of applications through a different computer, logical file, and logical unit number (LUN). It may thus not be possible to view a consolidated end-to-end view of the storage I/O capacity available when accessing the file. Without such an end-to-end view, it is difficult to plan, administer, or automatically adjust the storage I/O capacity to meet the expected level of service of a software application without over or under allocating storage resources.

SUMMARY

Total storage input/output (I/O) capacity is determined for a set of storage elements available for use by a software application located on an operating system volume of a computer system. The total storage I/O capacity is determined by evaluating storage I/O capacity of the storage elements at a physical device level and at a file level. A number of I/O storage operations performed on behalf of the software application are measured. Storage I/O utilization of the software application is determined based on the measured number of I/O storage operations as compared to the total storage I/O capacity of the set of storage elements. As an example, if a file is mapped to a LUN which in turn is striped across two physical storage devices which each can satisfy one hundred I/O operations per second for a specific software application I/O profile, the file may be calculated to have an estimated total capacity of two hundred I/O operations per second. The drives may be measured to receive fifty I/O operations per second occurring at a particular point in time all with the specific I/O profile. The file could thus be calculated as experiencing a utilization level of approximately twenty-five percent of its available capacity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
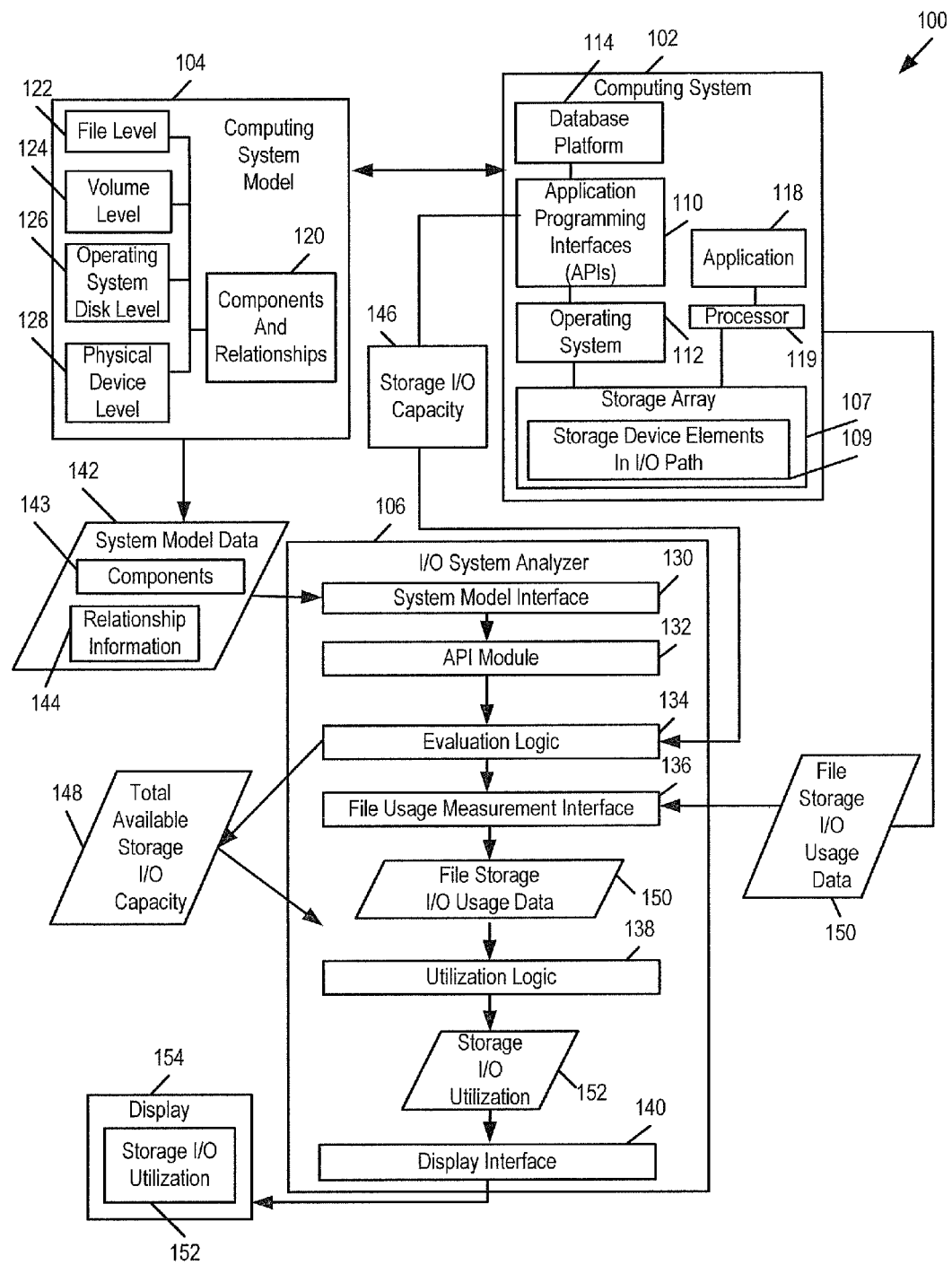
FIG. 1 is a block diagram to illustrate a first particular embodiment of a system that includes storage components and includes storage Input/Output (I/O) analysis functionality.

In a particular embodiment, a method is disclosed that includes determining a total storage input/output capacity of a set of storage elements available for use by a software application located on an operating system volume of a computer system. The total storage input/output capacity is determined by evaluating storage input/output capacity of the storage elements at a physical device level and at a file level. The method includes measuring a number of input/output storage operations performed on behalf of the software application. The method also includes determining a storage input/output utilization of the software application based on the measured number of input/output storage operations as compared to the total storage input/output capacity of the set of storage elements.

In another particular embodiment, a method is disclosed that includes relating an operating system file to a plurality of physical storage devices. A query is sent to application programming interfaces associated with the plurality of physical storage devices to determine one or more device properties, configuration data, and one or more usage statistics. Responses from the application programming interfaces are received, and a total available storage input/output capacity of the operating system file to access the plurality of physical storage devices is calculated based on the responses. The method includes determining storage input/output usage of the file and determining storage input/output utilization of the file based on the storage input/output usage of the file and based on the total available storage input/output capacity of the file.

In another particular embodiment, a system is disclosed that includes a system model interface to retrieve system model data identifying components of a modeled system and including information describing relationships between the components. Each of the components is associated with performing an input/output storage operation of a software application. The system includes an application programming interface (API) module responsive to the system model interface and operable to call application programming interfaces for each of the components and to receive storage input/output capacity data for each of the components. The system includes capacity evaluation logic to collect the received storage input/output capacity for each of the components to determine a total available storage input/output capacity for the software application. The system also includes a file usage measurement interface to retrieve file storage input/output usage data associated with the software application. The system includes utilization logic to calculate a storage input/output utilization associated with the software application based on the retrieved file storage input/output usage data and based on the total available storage input/output capacity for the software application. The system also includes a display interface to present the storage input/output utilization.

A consolidated, end-to-end view of a storage input/output (I/O) capacity and a storage I/O utilization for a particular file enables the storage I/O capacity to be managed to meet an expected level of service for the particular file without over-deploying or under-deploying storage I/O resources. The end-to-end view is developed by determining the capacity available by evaluating storage I/O capacity data at a physical device level and projecting the measurements through various levels of abstraction until reaching a file level.

FIG. 1 is a block diagram of a first particular embodiment of a storage system 100. FIG. 1 includes a computing system 102, a computing system model 104, and an input/output (I/O) system analyzer 106.

The computing system 102 includes a storage array 107, application programming interfaces (APIs) 110, an operating system 112, a database platform 114, and a monitored application 118. In a particular embodiment, the application 118 is a software application, such as a database application. The computing system model 104 includes components and relationships 120, a file level 122, an operating system volume level 124, an operating system disk level 126, and a physical storage level 128. The operating system volume level 124 and the operating system disk level 126 may be referred to as intermediate levels because they are between the physical storage level 128 and the file level 122. The I/O system analyzer 106 includes a system model interface 130, an API module 132, evaluation logic 134, a file usage measurement interface 136, utilization logic 138, and a display interface 140.

The operating system 112 of the computing system 102 is configured to manage the storage array 107. The storage array 107 may include multiple storage device elements in an I/O path 109. The storage device elements in the I/O path 109 may include a computer host bus adapter (HBA), a storage area network (SAN) switch, an array front-end port, an array processor, an array cache, an array back-end port, and an array physical disk. There may be more than one particular type of storage element in the I/O path 109. For example, there may be more than one computer HBA, array front-end port, array processor, array back-end port or array physical disk. The array processor is configured to respond to requests from the APIs 110 to provide information associated with the storage array 107.

The database platform 114 of the computing system 102 is configured to access the storage array 107 via the operating system 112. The APIs 110 are configured to provide extensions to the operating system 112 so that storage commands can be seamlessly accessed from the database platform 114. The APIs 110 are further configured to provide information associated with various I/O components. The APIs 110 may include a storage vendor API, a Storage Management Initiative (SMI) provider API, a common information management object manager (CIMOM) API, a common information management extensible markup language (CIM-XML) API, a web services for management (WS-Man) API, a system services application API, a performance counter API, other API, or any combination thereof. The application 118 is configured to access the storage array 107 via the APIs 110. In a particular embodiment, the application 118 is a database application, such as a structured query language (SQL) database file that is physically constrained to a specific number of I/O storage accesses per second.

The computing system model 104 is configured to model the computing system 102. The components and relationships 120 of the computer system model 104 include the name of components of the computing system 102 available to perform I/O operations and the relationships between the components. The components and relationships 120 are modeled at the file level 122, at the operating system volume level 124, at the operating system disk level 126, and at the physical storage level 128. The operating system volume level 124 and the operating system disk level 126 are also referred to as intermediate levels.

The I/O system analyzer 106 is configured to use the computing system model 104 to model I/O requests of the application 118 of the computing system 102 at the file level 122, the intermediate levels 124 and 126, and at the physical storage level 128. The I/O system analyzer 106 is further configured to systematically evaluate all the components necessary to complete the I/O requests and provide an end-to-end view of the consolidated I/O storage utilization.

The system model interface 130 of the I/O system analyzer 106 is operable to retrieve system model data 142 identifying components 143 of the computing system model 104. Each of the components 143 is available to satisfy a storage I/O request of the application 118 of the computing system 102. The system model interface 130 is further operable to retrieve relationship information 144 describing relationships between the components 143. The system model data 142 may include a hierarchical tree data structure based on the components 143 and the relationship information 144. The relationship information 144 may include a data structure that can be accessed to identify one or more alternative I/O paths or concurrent I/O paths to reach a target (e.g., one or more physical storage devices).

The API module 132 of the I/O system analyzer 106 is responsive to the system model interface 130 and operable to call APIs 110 of the computing system 102 for each of the components 143 and to determine storage I/O capacity 146 for each of the components 143. The evaluation logic 134 is operable to combine the received storage I/O capacity 146 for each of the components 143 to determine a total available storage I/O capacity 148 for the application 118. The file usage measurement interface 136 is operable to retrieve file storage I/O usage data 150 associated with the application 118. In a particular illustrative embodiment, a workload of the application 118 is recorded. The recorded workload of the application 118 is replayed at a target component of the computing system 102. The target component of the workload may include one or more physical devices of the computer system 102 (e.g., physical devices of the storage array 107). Alternatively, the workload may be targeted at the entire computer system 102. The recorded workload is applied to a target component of a modeled system (e.g., the computing system 102 of FIG. 1) at an increased rate or with an increased concurrency until a threshold event is detected. The threshold event may indicate that a maximum storage I/O capacity has been reached. For example, a measured rate of increase of I/O latency may become non-linear or another selected capacity-indicating threshold event may be satisfied. When the rate of increase of the detected I/O latency becomes non-linear, or when another selected threshold event is satisfied, the maximum storage I/O capacity corresponding to the detected threshold event represents the total storage I/O capacity accessible to the application 118.

In a particular embodiment, the received storage I/O capacity 146 is collected for each component in a single I/O path, in alternate I/O paths or in concurrent I/O paths The relationship information 144 may be accessed to identify one or more alternative I/O paths or concurrent I/O paths to reach the target component of the modeled system (e.g., the computing system 102 of FIG. 1). For example, each of the storage device elements in the I/O path 109 may be identified based on the relationship information 144.

The utilization logic 138 of the I/O system analyzer 106 is operable to calculate a storage I/O utilization 152 associated with the application 118 based on the retrieved file storage I/O usage data 150 and based on the total available storage I/O capacity 148 for the application 118. The display interface 140 is operable to present the storage I/O utilization 152 at the display 154.

In operation, the application 118 of the computing system 102 is mapped to the set of storage elements 109, which may include a plurality of physical storage devices. The components and relationships 120 of the computing system model 104 are a model of the components of the computing system 102 and their relationships at the file level 122, the operating system volume level 124, the operating system disk level 126, and at the physical storage level 128. Each modeled component is available to satisfy a storage I/O request of the application 118. The computing system model 104 includes the set of storage elements 109. The set of storage elements 109 may include a set of physical storage devices. The computing system model 104 includes models of storage I/O requests of the application 118 that identify components available to satisfy the storage I/O requests at the file level 122, at the operating system volume level 124, at the operating system disk level 126, and at the physical storage level 128.

The system model interface 130 of the I/O system analyzer 106 receives system model data 142 from the computing system model 104. The API module 132 sends a query to the APIs 110 of the computing system 102 associated with the set of storage elements 109. The evaluation logic 134 receives responses from the APIs 110 that include storage I/O capacity 146 for each of the components 143. The evaluation logic 134 determines the total available storage I/O capacity 148 of the application 118 within the set of storage elements 109 based on the responses from the APIs 110.

In a particular embodiment, the total available storage I/O capacity 148 is determined based on a given workload and based on a storage I/O capacity of those components of the computing system 102 identified as available for use by the application 118. In another particular embodiment, the storage I/O capacity available to support storage I/O requests at each of the components 143 is determined and then the total available storage I/O capacity 148 is determined by consolidating the storage I/O capacity at each of the components 143.

Thus, the total storage I/O capacity 148 is determined by evaluating storage I/O capacity of the storage device elements in an I/O path 109 at the physical device level 128, at the volume level 124, and at the file level 122. The number of I/O storage operations performed on behalf of the application 118 is determined, and the storage I/O utilization 152 of the application 118 is determined based on the measured number of I/O storage operations as compared to the total available storage I/O capacity 148 of the set of storage elements 109. The storage I/O utilization 152 may be determined as a ratio of the measured number of I/O storage operations to the total available storage I/O capacity 148. The display interface 140 presents the storage I/O utilization 152 of the application 118.

The file usage measurement interface 136 of the I/O system analyzer 106 determines storage I/O usage of the application 118 by querying the operating system 112 or the database platform 114 via the file manager 116 and receiving the file storage I/O usage data 150. The utilization logic 138 determines the storage I/O utilization 152 of the application 118 based on the retrieved file storage I/O usage data 150 of the application 118 and based on the total available storage I/O capacity 148 for the application 118. The I/O system analyzer 106 may determine the file storage I/O usage data 150 of the application 118 periodically and update the storage I/O utilization 152 of the application 118 displayed at the display 154 periodically.

By periodically displaying the storage I/O utilization 152, the I/O system analyzer 106 may be used to detect a usage of the application 118 that approaches a storage I/O resource limit before the usage exceeds the storage I/O resource limit. Various actions may be performed to avoid exceeding the storage I/O resource limit, such as allocating additional storage resources to the application 118 or terminating execution of the application 118.

Figure 2:
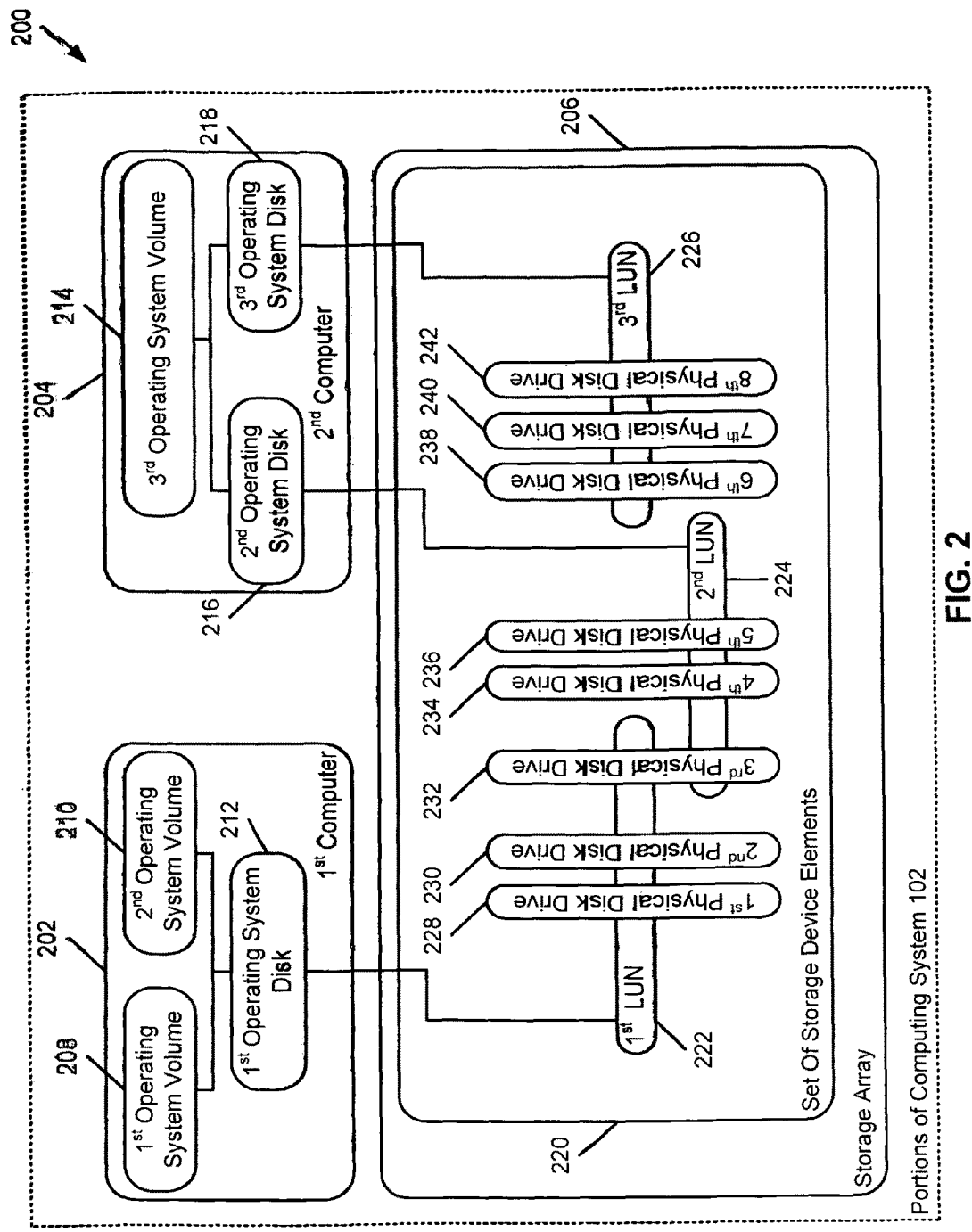
FIG. 2 is a block diagram to illustrate a particular embodiment of selected portions of the computing system of FIG. 1.

FIG. 2 is a block diagram of a particular embodiment of selected portions of the computing system 102 of FIG. 1. FIG. 2 includes a first computer 202, a second computer 204, and a storage array 206. The storage array 206 is also known as a set of storage elements (e.g., the set of storage elements 109 in FIG. 1). The first computer 202 and the second computer 204 include one or more operating system volumes (e.g., Windows volumes) and one or more operating system disks (e.g., Windows disks). The first computer 202 includes a first Windows disk 212 partitioned into a first Windows volume 208 and a second Windows volume 210. The second computer 204 includes a third Windows volume 214 spanning a second Windows disk 216 and a third Windows disk 218. In a particular embodiment, the storage array 206 is the storage array 107 in FIG. 1.

The storage array 206 includes a set of storage device elements 220 in a particular representative I/O path. The set of storage device elements 220 in the I/O path may include a computer host bus adapter (HBA), a storage area network (SAN) switch, an array front-end port, an array processor, an array cache, an array back-end port, and an array physical disk. There may be more than one particular type of storage device element in the I/O path. For example, there may be more than one computer HBA, array front-end port, array processor, array back-end port or array physical disks. In the embodiment shown in FIG. 2, the set of storage device elements 220 (e.g., physical storage elements) includes a first logical unit number (LUN) 222, a second LUN 224, and a third LUN 226. The physical storage elements 220 are also referred to as a storage pool. A LUN is a logical component that maps one or more physical storage devices to logical storage space for use by the Windows disks 212, 216, and 218. The first LUN 222 maps a first physical storage device 228, a second physical storage device 230, and a third physical storage device 232 to logical storage space for the first Windows disk 212 of the first computer 202. The second LUN 224 maps the third physical storage device 232, a fourth physical storage device 234, and a fifth physical storage device 236 to logical storage space for the second Windows disk 216 of the second computer 204. The third LUN 226 maps a sixth physical storage device 238, a seventh physical storage device 240, and an eighth physical storage device 242 to the third Windows disk 218 of the second computer 204.

The set of storage elements 220 includes the separate physical storage devices 228, 230, 232, 234, 236, 238, 240, and 242. At least some of the physical storage devices 228, 230, 232, 234, 236, 238, 240, and 242 are associated with at least one of the LUNs 222, 224, and 226. At least one of the LUNs 222, 224, and 226 is associated with at least one of the Windows disks 212, 216, and 218 and each of the Windows disks 212, 216, and 218 is associated with at least one of the Windows volumes 208, 210, and 214. In a particular embodiment, each of the Windows disks has multiple volumes. For example, in FIG. 2, the first Windows disk 212 has the first Windows volume 208 and the second Windows volume 210. In a particular embodiment, each of the Windows volumes has multiple Windows disks. For example, in FIG. 2, the third Windows volume 214 has the second Windows disk 216 and the third Windows disk 218.

In the particular embodiment shown in FIG. 2, the set of storage elements 220 includes a storage array 206 comprising multiple physical storage devices 228, 230, 232, 234, 236, 238, 240, and 242 and multiple LUNs 222, 224, and 226. The third physical storage device 232 is shared by the first LUN 222 and the second LUN 224.

When calculating the storage I/O utilization 152 of FIG. 1, the I/O system analyzer 106 determines characteristics of each storage element at a physical storage device level, including the physical disks or portions of shared physical disks of the set of storage elements 220 of the storage array 206. The I/O system analyzer 106 collects metrics of each storage element at a volume level, such as at the level of Windows volumes 208, 210, and 214. The I/O system analyzer 106 determines the total available storage I/O capacity 148 based on the metrics and based on the characteristics.

In a particular embodiment, a method of determining I/O capacity uses synthetic I/O load generation. The method includes measuring an I/O workload profile of a file using storage instrumentation APIs. The measurement may run for a time period that is long enough to capture periodic behavior in the I/O workload. For example, properties of an I/O workload profile may include an I/O pattern (e.g., composition of random and sequential operations), an I/O type (e.g., a composition of read and write operations), an I/O size (e.g., an average number of bytes per I/O), or an I/O rate (e.g., an average number of input/output operations per unit time). The storage instrumentation APIs may include Microsoft SQL Server Dynamic Management Views (DMVs), or Windows performance counters, among other alternatives.

A temporary file is created on the same logical volume as the file under analysis. The temporary file is used as the target for generating synthetic I/O workload. A synthetic I/O workload generator is configured to reflect the I/O workload profile. The synthetic I/O workload generator is run against the temporary file using the I/O workload profile. The I/O rate is incrementally increased, and an I/O latency is recorded with each increase in the I/O rate. When a rate of increase of I/O latency becomes non-linear, the I/O rate is no longer increased. The maximum I/O rate (e.g., the I/O rate recorded when the rate of increase of the detected I/O latency becomes non-linear) represents the total available storage I/O capacity of the file under analysis. In addition to I/O latency, other thresholds and measurements of detectable effects on capacity may also be used.

In another particular embodiment, a method of determining I/O capacity uses individual storage device analysis. Statistics are measured over a period of time to generate a representation of utilization of devices in general. Storage instrumentation APIs are used to measure I/O utilization of each storage device element in the I/O path of the file under analysis. For example, storage device elements in the I/O path may include a computer host bus adapter (HBA), a storage area network (SAN) switch, an array front-end port, an array processor, an array cache, an array back-end port, and an array physical disk. There may be more than one particular type of storage element in the I/O path. For example, there may be more than one computer HBA, array front-end port, array processor, array back-end port or array physical disks. The utilization of each storage device element in the I/O path is obtained by using a combination of the storage instrumentation APIs. The measurement is run for a long enough period of time to capture periodic behavior of I/O statistics. The I/O rate of the database file under analysis is measured over the same time interval as the measurement of the I/O utilization of each of the storage elements in the I/O path. Optionally, a time-average value of the I/O statistics is determined. The storage device element in the I/O path with the minimum storage I/O capacity is identified, representing a potential bottleneck in the I/O path. The identified storage device element that has the minimum storage I/O capacity represents the total available storage I/O capacity of the file under analysis.

An operating system level I/O request may traverse one or more alternative I/O paths to identify a potential bottleneck in each of the one or more alternative I/O paths. When an operating system level I/O request traverses each alternative I/O path to reach a target, a capacity measurement may be obtained for each alternative path. For example, if there are two alternative paths to a target, a first capacity measurement is obtained for a first alternative path, and a second capacity measurement is obtained for a second alternative path. The first capacity measurement for the first alternative path corresponds to a first storage device in the first alternative path that has a first minimum storage I/O capacity. Similarly, the second capacity measurement for the second alternative path corresponds to a second storage device in the second alternative path that has a second minimum storage I/O capacity. Since multiple I/O paths are available, the total available storage I/O capacity may be selected as the minimum storage I/O capacity of the original I/O path or the minimum storage I/O capacity of any of the alternative I/O paths (e.g., the first minimum storage I/O capacity of the first alternative path or the second minimum storage I/O capacity of the second alternative path). The selection may be made by the system based on particular system or application design considerations. A conservative approach may select the smallest minimum storage I/O capacity of all paths to protect the most resource constrained path. This selection protects against system operation performance issues where the system uses the most resource constrained path. Alternatively, an assumption may be made that the system selects the path with the most resources available (e.g., a "smart system") and in this case, the total available storage I/O capacity may be the capacity of the path with the largest available capacity. Thus, the system can determine a total available storage I/O capacity where there are multiple available paths.

In the concurrent I/O path scenario, when the operating system level I/O request traverses concurrent I/O paths to reach the target, multiple measurements may be obtained for each concurrent path. For example, if there are two concurrent paths to the target, a first capacity measurement is obtained for a first concurrent path, and a second capacity measurement is obtained for a second concurrent path. In a particular embodiment, the first capacity measurement and the second capacity measurement are then summed to determine the total storage capacity available.

By measuring storage I/O capacity and storage I/O usage starting at the physical storage device level up to the volume level, the I/O system analyzer 106 can accurately determine the storage I/O capacity and storage I/O usage for a file through the various layers of abstraction.

Figure 3:
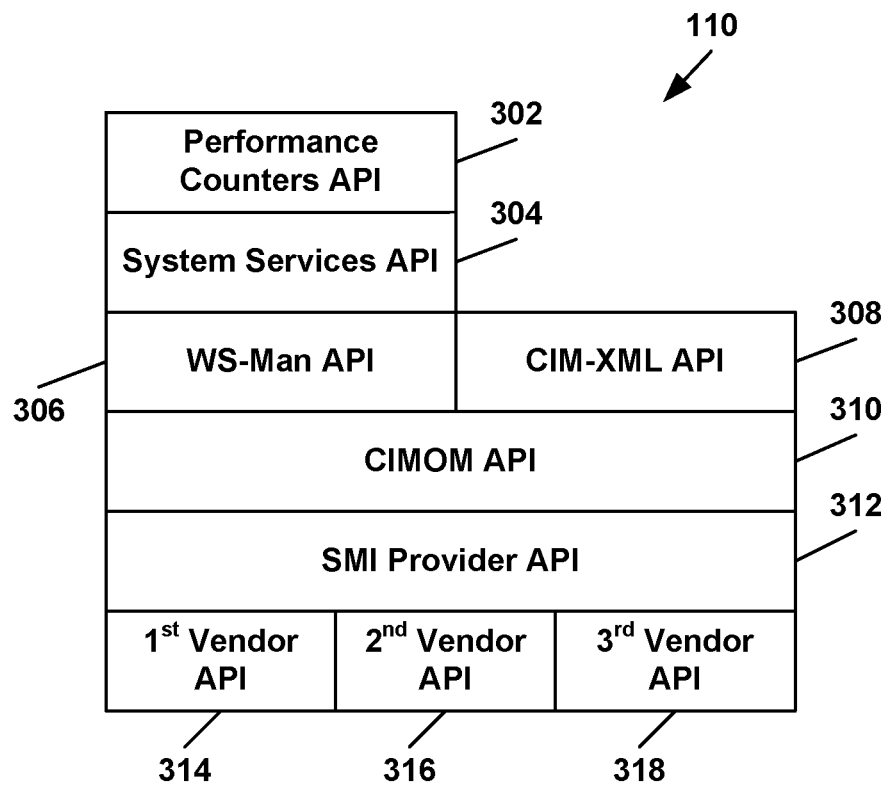
FIG. 3 is a general diagram to illustrate a particular embodiment of application programming interfaces (APIs) used to retrieve storage I/O capacity information from components of the storage system of FIG. 1.

FIG. 3 is a general diagram that illustrates a particular embodiment of application programming interfaces (APIs) 110 used to retrieve storage I/O capacity information from components of the storage system of FIG. 1. The APIs 110 include a performance counters API 302, a system services API 304, a web services for management (WS-Man) API 306, a common information management extensible markup language (CIM-XML) API 308, a common information management object manager (CIMOM) API 310, a Storage Management Initiative (SMI) provider API 312, a first vendor API 314, a second vendor API 316, and a third vendor API 318. Each of the APIs 302-318 passes storage performance and configuration information from one or more storage devices associated with each respective API.

Figure 4:
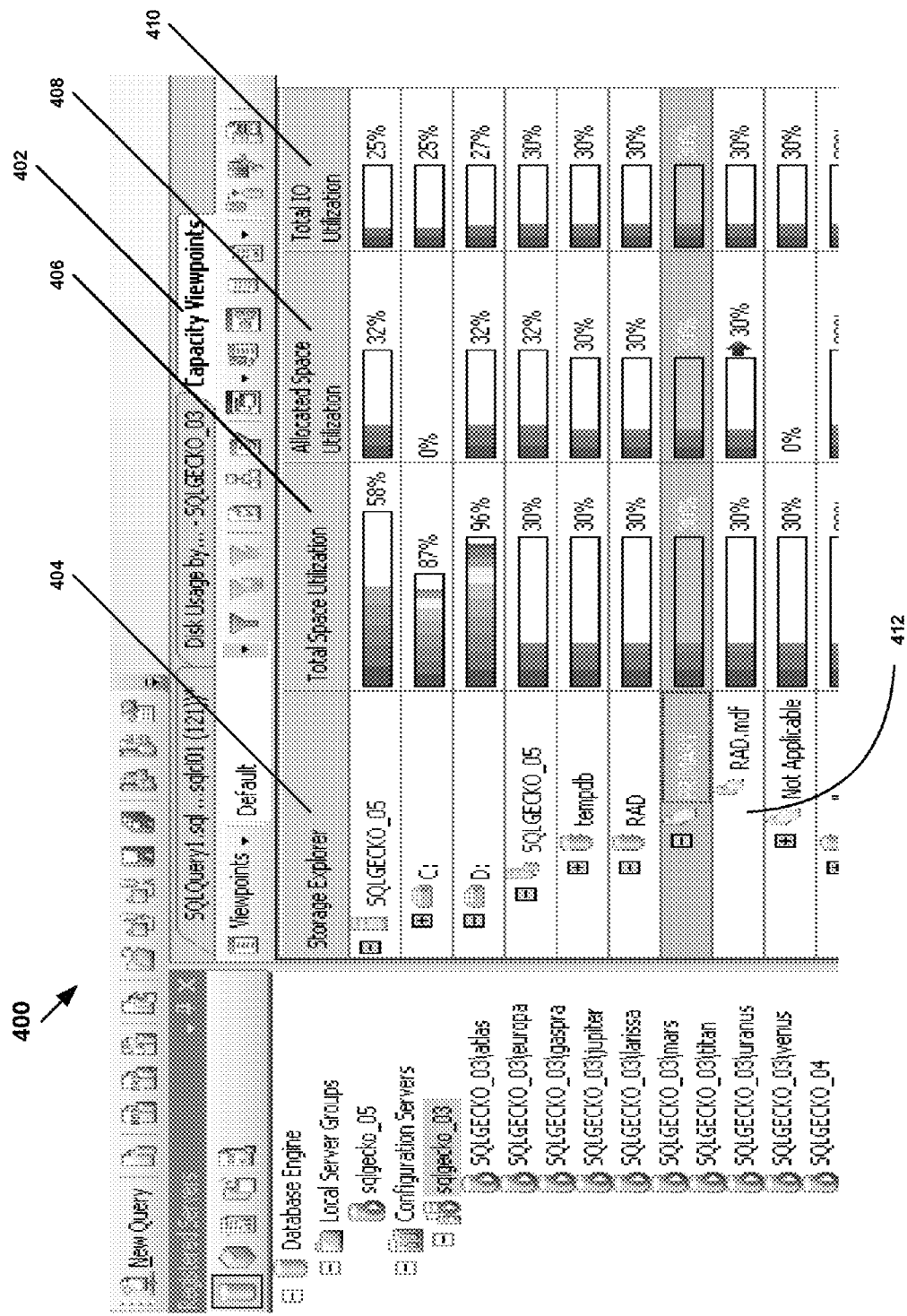
FIG. 4 is a screen view diagram to illustrate a particular embodiment of a visual display that includes storage I/O utilization information.

FIG. 4 is a screen view diagram to illustrate a particular embodiment of a visual display that includes storage I/O utilization information. FIG. 4 includes a capacity viewpoints tab 402, a storage explorer column 404, a total space utilization column 406, an allocated space utilization column 408, and a total I/O utilization column 410. The capacity viewpoints tab 402 is selectable to visually display different views of I/O utilization. For example, the capacity viewpoints 402 may display I/O utilization at a physical storage level, at an operating system disk level (e.g., Windows disk level), at a volume level (e.g., Windows volume level, at a file level, or at a database level. The storage explorer column 404 may be used to navigate the various storage levels to enable the display of storage I/O utilization for each respective level.

The total space utilization column 406 displays a percentage of the total storage space utilized at each level for each storage device, such as a disk, an operating system storage volume, or a logical unit number. The allocated space utilization column 408 displays a percentage of the allocated space utilized by a particular file when it is limited from using the total space available for a volume by some other software based allocation restriction. The total I/O utilization 410 column displays the storage I/O utilization such as determined for the system 100, for a volume, or for a database.

By periodically determining and displaying the screen 400 including the capacity viewpoints tab 402, the storage explorer column 404, the total space utilization column 406, the allocated space utilization column 408, and the total I/O utilization column 410, a system analyzer, such as the I/O system analyzer 106, as shown in FIG. 1, enables a system administrator to detect usage of a software application that approaches a storage I/O resource limit before the file usage exceeds the storage I/O resource limit. Alternatively, a deviation from a predetermined storage I/O utilization range may be automatically determined in order to alert the system administrator to take remedial action. For example, a system administrator may stop execution of a particular software application or allocate additional storage elements to the file to prevent the storage I/O resource limit from being exceeded. An example file that may be monitored is the illustrated file "RAD.mdf" 412 in FIG. 4. If the storage I/O utilization of the file 412 exceeded a threshold, such as 90%, then a database administrator could take action proactively to avoid a storage I/O utilization event that could affect performance.

Figure 5:
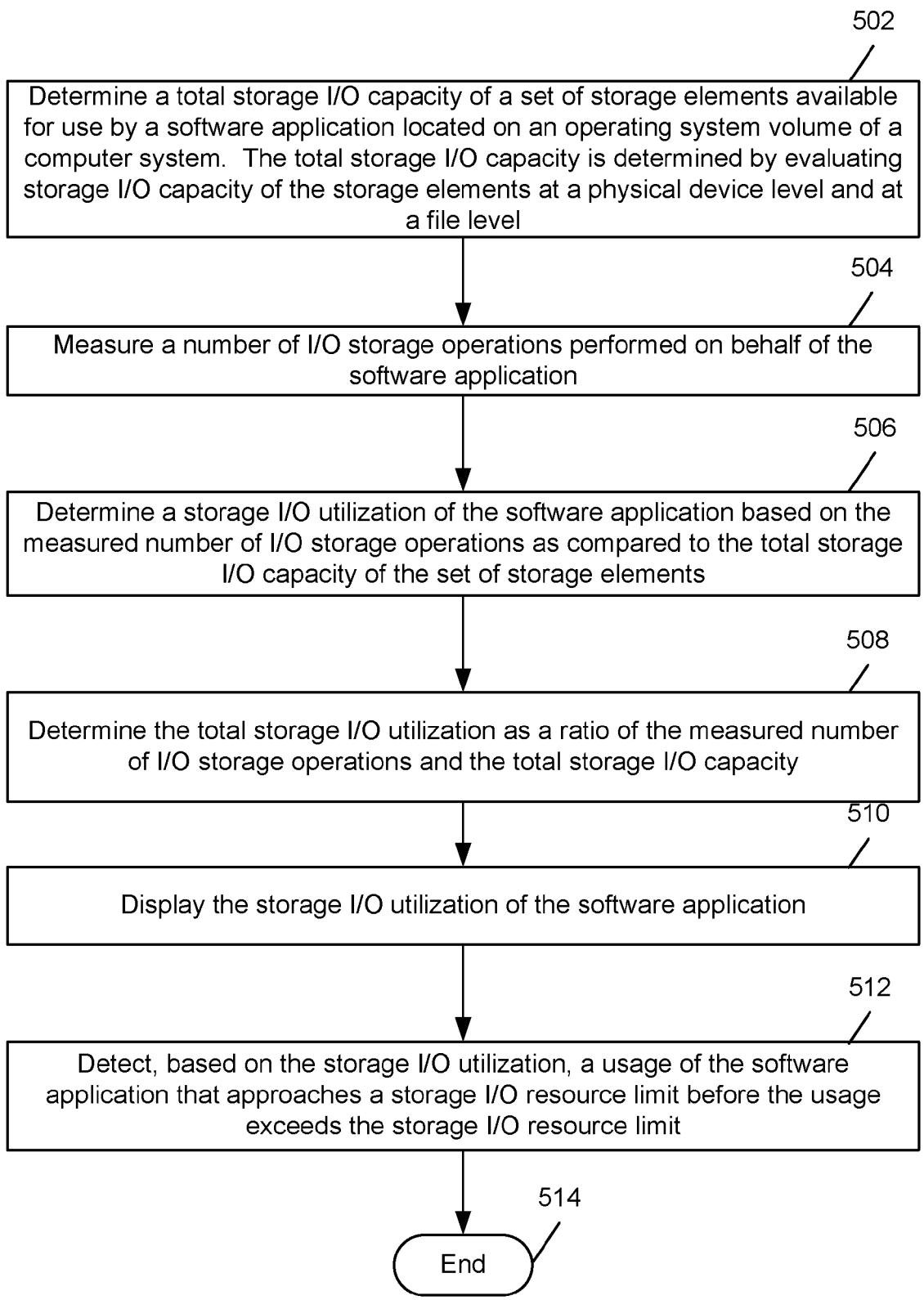
FIG. 5 is a flow diagram to illustrate a first particular embodiment of a method of determining storage I/O utilization associated with a software application.

FIG. 5 is a flow diagram that illustrates a first particular embodiment of a method of determining storage I/O utilization associated with a software application.

At 502, a total storage I/O capacity of a set of storage elements available for use by a software application of a computer system is determined. The software application is located on an operating system volume of the computer system. The total storage I/O capacity is determined by evaluating storage I/O capacity of the storage elements at a physical device level and at a file level as previously described. A system model may be used to identify the storage I/O capacity for each storage element. In a particular embodiment, the set of storage elements includes a storage array comprising a plurality of physical storage devices and a plurality of logical unit numbers, where at least one of the physical storage devices is shared by at least two of the logical unit numbers. In a particular embodiment, the set of storage elements includes a plurality of physical storage devices, and the method further includes identifying one of the storage elements as a potential bottleneck in an I/O path. In one embodiment, an operating system level I/O request traverses one or more alternative paths to reach a target, where the target includes one or more physical storage devices.

In a particular embodiment, evaluating storage I/O capacity includes determining characteristics of each storage element at a physical storage device level. Each storage element includes physical storage devices or portions of shared physical storage devices. Metrics are collected for each storage element at a file level. A total storage I/O capacity is determined based on the characteristics and based on the metrics.

Continuing to 504, a number of I/O storage operations performed on behalf of the software application is measured. Moving to 506, a storage I/O utilization of the software application is determined based on the measured number of I/O storage operations as compared to the total storage I/O capacity of the set of storage elements. In a particular embodiment, the method further comprises determining a resource governed utilization of the storage I/O capacity based on historical usage of the storage I/O capacity as compared to a governed storage I/O capacity available and a non-governed storage I/O capacity available. The resource governed utilization may include a storage I/O capacity utilization after taking into account software based restrictions on storage I/O capacity available to the software application. For example, the software application may include an operating system file residing on an operating system volume, where the operating system volume is constrained to a predetermined number of input/output storage accesses per second. The resource governed utilization of the storage I/O capacity is determined based on the software based restrictions.

In another particular embodiment, the method includes determining the total storage I/O utilization as a ratio of the measured number of I/O storage operations and the total storage I/O capacity, as shown at 508. Proceeding to 510, the storage I/O utilization of the software application is displayed. Based on the storage I/O utilization, a usage of the software application that approaches a storage I/O resource limit may be detected before the usage exceeds the storage I/O resource limit, as shown at 512. The method ends at 514.

Figure 6:
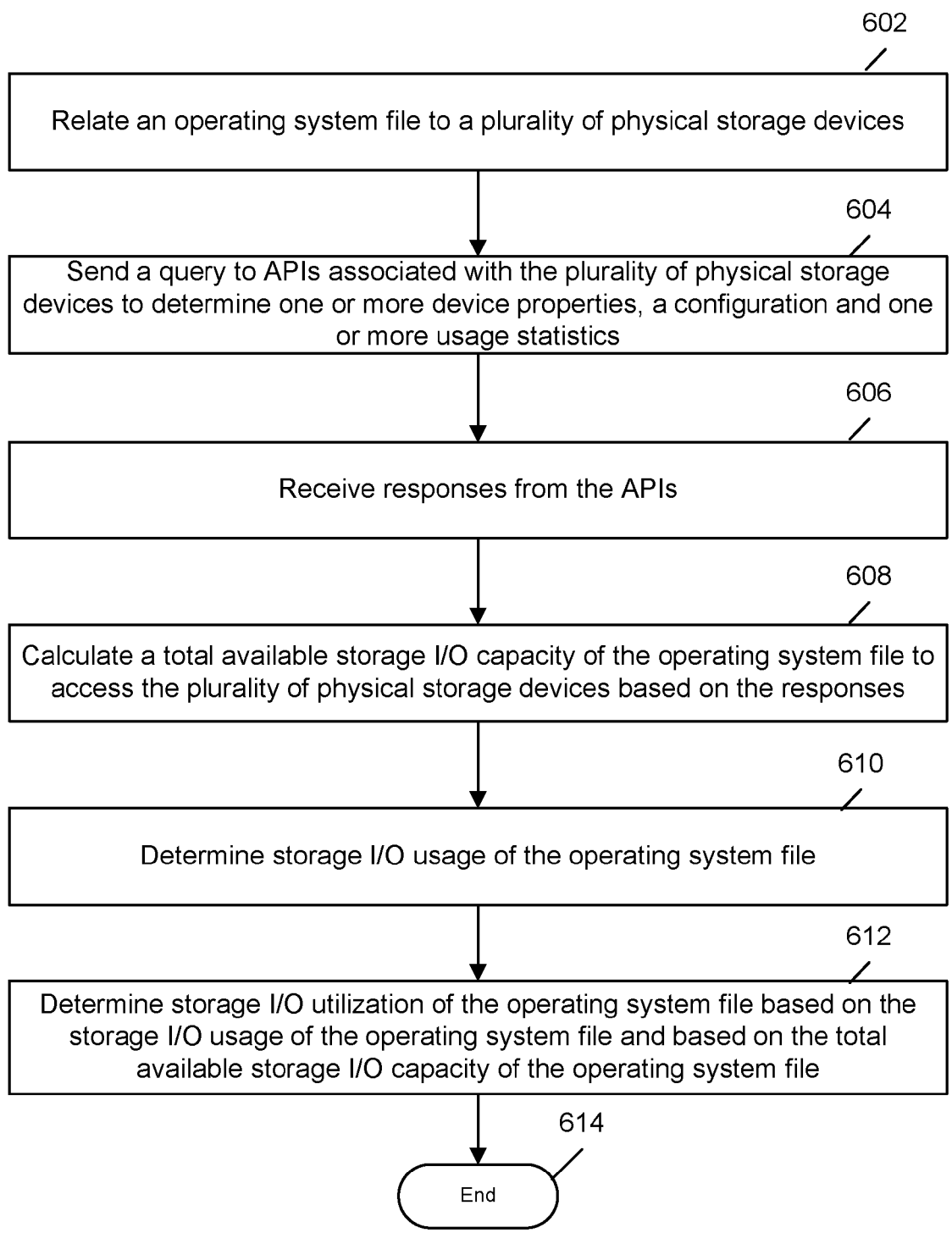
FIG. 6 is a flow diagram to illustrate a second particular embodiment of a method of determining storage I/O utilization associated with a software application.

FIG. 6 is a flow diagram to illustrate a second particular embodiment of a method of determining storage I/O utilization associated with an application, such as a software application. The method includes relating an operating system file to a plurality of physical storage devices, at 602. A query is sent to application programming interfaces (APIs) associated with the plurality of physical storage devices to determine one or more device properties, configuration data, and one or more usage statistics, at 604. Responses are received from the APIs, at 606. A total available storage I/O capacity of the operating system file to access the plurality of physical storage devices is calculated based on the responses, at 608. Storage I/O usage of the operating system file is determined, at 610. Moving to 612, storage I/O utilization of the operating system file is determined based on the storage I/O usage of the operating system file and based on the total available storage I/O capacity. In a particular embodiment, determining the storage I/O utilization includes determining a percentage of the total available storage I/O capacity used by the operating system file. The method ends at 614.

In a particular embodiment, the method further comprises modeling components of a computing system that include the plurality of physical storage devices, modeling relationships between the components, and determining the total available storage I/O capacity based on a given workload and based on a storage I/O capacity of those components of the computing system identified as available for use by the operating system file.

Figure 7:
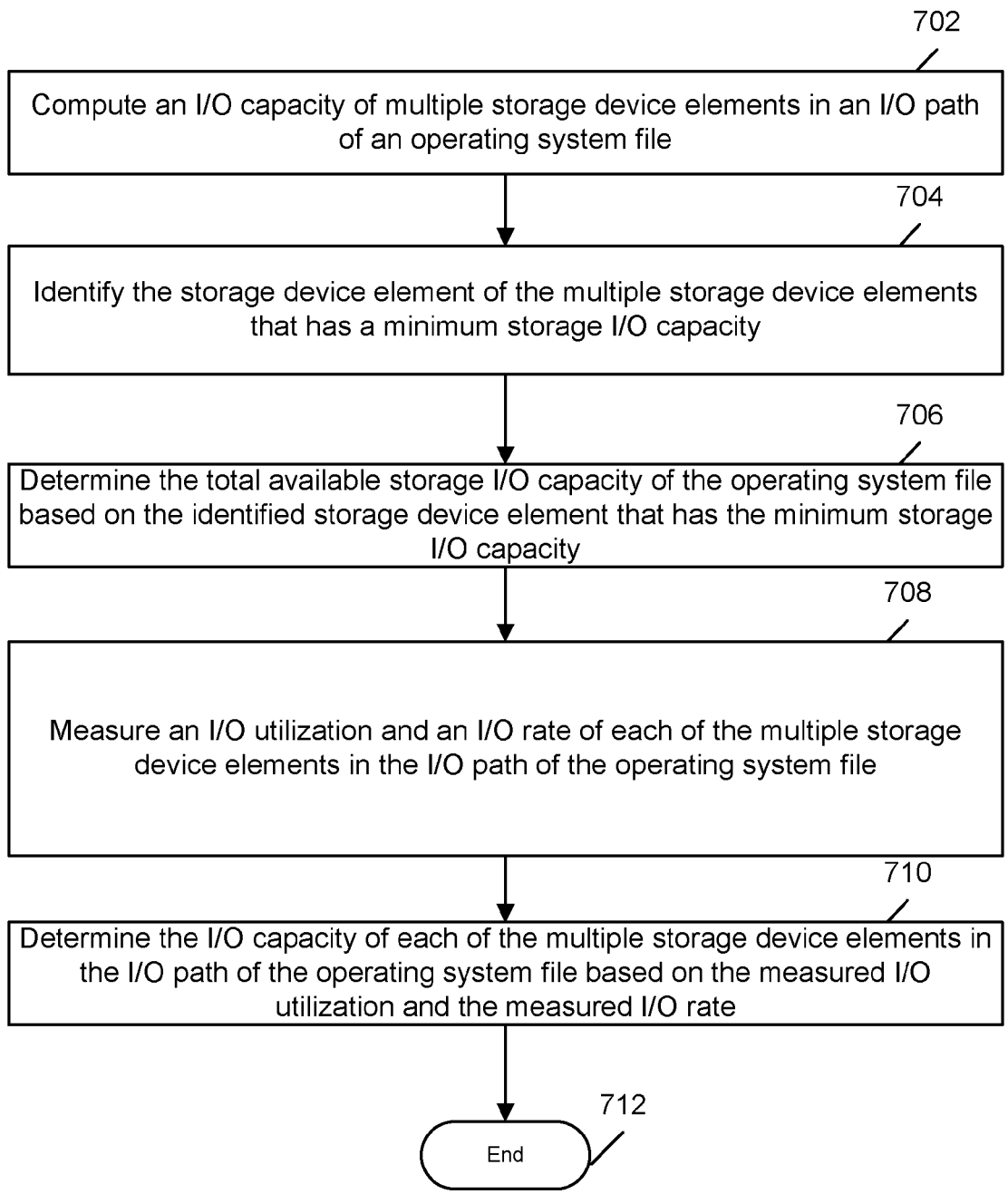
FIG. 7 is a flow diagram to illustrate a particular embodiment of a method of calculating a total available storage I/O capacity of a file.

FIG. 7 is a flow diagram to illustrate a particular embodiment of a method of calculating a total available storage I/O capacity of an operating system file. In a particular embodiment, the flow diagram of FIG. 7 illustrates the calculation shown at 608 of FIG. 6.

The method includes computing an I/O capacity of each of the multiple storage device elements in an I/O path of the operating system file, at 702. The method includes identifying the storage device element that has a minimum storage I/O capacity, at 704. The total available storage I/O capacity of the operating system file is determined, at 706. The storage device element identified as having the minimum storage I/O capacity represents the total available storage I/O capacity of the operating system file, and thereby determining the total available storage I/O capacity of the file, as shown at 706. In a particular embodiment, at 708, the method further includes measuring an I/O utilization and an I/O rate of each storage device element in the I/O path of the operating system file. In a particular embodiment, the I/O capacity of each of the storage device elements in the I/O path is computed based on the measured I/O utilization and the measured I/O rate, at 710. At 712, the method ends.

In a particular embodiment, the method further comprises periodically determining the storage I/O usage of the operating system file and updating the storage I/O utilization of the operating system file periodically.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
    identifying a set of storage elements mapped to a software application;
    determining a total storage input/output capacity of the set of storage elements mapped to the software application located on an operating system volume of a computer system, wherein the total storage input/output capacity is determined by a processor evaluating storage input/output capacity of the storage elements at a physical device level, at an intermediate level, and at a file level;
    measuring a number of input/output storage operations performed on behalf of the software application; and
    determining a storage input/output utilization of the software application at the processor based on the measured number of input/output storage operations as compared to the total storage input/output capacity of the set of storage elements.

2. The method of claim 1, wherein the set of storage elements is identified as mapped to the software application by use of a computing system model that identifies the set of storage elements and wherein the computing system model includes a model of components of a computing system and their relationships at a file level, at an operating system volume level, at an operating system disk level, and at a physical storage level, and wherein each of the components of the computer system model is available to satisfy a storage input/output request of the software application, and further comprising determining a resource governed utilization of the storage input/output capacity based on historical usage of the storage input/output capacity as compared to a governed storage input/output capacity available and a non-governed storage input/output capacity available.

3. The method of claim 1, further comprising:
  determining the total storage input/output utilization as a ratio of the measured number of input/output storage operations and the total storage input/output capacity; and
  displaying the storage input/output utilization of the software application.

4. The method of claim 1, wherein the set of storage elements comprises a plurality of physical storage devices, the method further comprising identifying one of the storage elements of the set of storage elements as a potential bottleneck in an input/output path, and wherein the software application is a structured query language database file that is physically constrained to a specific number of input/output storage accesses per second.

5. The method of claim 4, wherein an operating system level input/output request traverses one or more alternative paths to reach a target, wherein the target includes one or more of the physical storage devices.

6. The method of claim 1, further comprising recording a workload of the software application and replaying the recorded workload at a computing system with an increased rate or an increased concurrency.

7. The method of claim 1, further comprising using a combination of different storage instrumentation application programming interfaces to determine storage input/output utilization of each of the storage elements in the set of storage elements.

8. The method of claim 1, further comprising detecting, based on the storage input/output utilization, a usage of the software application that approaches a storage input/output resource limit before the usage exceeds the storage input/output resource limit.

9. The method of claim 1, wherein evaluating storage input/output capacity comprises:
  determining characteristics of each storage element at the physical storage device level, each storage element including physical storage devices or portions of shared physical storage devices;
  collecting metrics of each storage element at an operating system file level; and
  determining the total storage input/output capacity based on the characteristics and based on the metrics.

10. The method of claim 1, wherein the storage capacity of each storage element in the set of storage elements corresponds to the total storage input/output capacity accessible to the software application, and wherein the set of storage elements are a subset of components of the computer system and wherein the set of storage elements are those components of the computer system that are available for use by the software application.

11. A method, comprising:
  relating an operating system file to a subset of a plurality of physical storage devices of a computer system, wherein the subset of the plurality of physical storage devices indicates those storage devices that are in an input/output path of the operating system file;
  sending a query to application programming interfaces associated with the subset of the plurality of physical storage devices to determine one or more device properties, configuration data, and one or more usage statistics;
  receiving responses from the application programming interfaces;
  calculating a total available storage, input/output capacity of the operating system file to based on the responses;
  determining storage input/output usage of the operating system file; and
  determining storage input/output utilization of the operating system file based on the storage input/output usage of the operating system file and based on the total available storage input/output capacity of the operating system file.

12. The method of claim 11, further comprising:
  modeling components of the computing system that include the plurality of physical storage devices;
  modeling relationships between the components; and
  determining the total available storage input/output capacity of the operating system file based on a given workload and based on a storage input/output capacity of those components of the computing system identified as available for use by the operating system file and within the subset of the plurality of storage devices, wherein the application programming interfaces (APIs) include a first API of a first API type and a second API of a second API type, and wherein the second API is a storage instrumentation API.

13. The method of claim 11, wherein calculating the total available storage input/output capacity of the operating system file includes:
  computing an input/output capacity of each of multiple storage device elements in an input/output path of the operating system file;
  identifying the storage device element of the multiple storage device elements that has a minimum storage input/output capacity; and
  wherein the identified storage device element that has the minimum storage input/output capacity represents the total available storage input/output capacity of the operating system file.

14. An apparatus comprising a computer readable storage device comprising instructions that executable by a processor to:
  retrieve system model data stored in a memory device, the system model data identifying components of a modeled system and including information describing relationships between the components, wherein each of the components is associated with performing an input/output storage operation of a software application, the software application mapped to each of the components by a data structure of the system model data stored in the memory device;
  call application programming interfaces for each of the components and to receive storage input/output capacity data for each of the components;
  collect the received storage input/output capacity for each of the components to determine a total available storage input/output capacity for the software application;
  retrieve file storage input/output usage data associated with the software application, the file storage input/output usage data retrieved by periodically querying a database platform to obtain measured usage data of the components;

calculate a storage input/output utilization associated with the software application based on the retrieved file storage input/output usage data and the total available storage input/output capacity for the software application; and present the storage input/output utilization to a display device.

15. The apparatus of claim 14, wherein the application programming interfaces comprise at least one of a vendor application programming interface (API), a Storage Management Initiative (SMI) provider API, a common information management object manager (CIMOM) API, a common information management extensible markup language (CIM-XML) API, a web services for management (WS-Man) API, a system services application API, and a performance metric API.

16. The apparatus of claim 14, wherein a recorded workload is applied to a target component of the modeled system at an increased rate or an increased concurrency until a measured rate of increase of input/output latency becomes nonlinear.

17. The apparatus of claim 16, wherein a measured storage capacity of the target component at the time when the rate of increase of the input/output latency becomes nonlinear is the storage input/output storage capacity of the target component that is used to determine the total available input/output capacity for the software application.

18. The apparatus of claim 14, wherein the received storage input/output capacity for each of the components is collected via concurrent paths or via alternative paths.

19. The apparatus of claim 14, wherein the display device displays capacity viewpoints indicating input/output utilization of the software application at a physical storage level, at an operating system disk level, at a volume level, and at a file level.

20. The apparatus of claim 14, wherein an allocated space utilization region in a view displayed on the display device displays a percentage of allocated space utilized by the software application when the software application is limited from using a total space available for a volume by an allocation restriction of another software application.

* * * * *